April 27, 1965 W. N. WAINWRIGHT 3,181,115

UNDERWATER TELEPHONY

Filed April 18, 1958 3 Sheets-Sheet 1

INVENTOR.
Walter N. Wainwright

BY

W. A. Quesenbery
Leo J. Hennigsen
ATTORNEYS

INVENTOR.
WALTER N. WAINWRIGHT
BY
W. O. Quesenbery
Leo J. Humphreys
ATTORNEYS

April 27, 1965 W. N. WAINWRIGHT 3,181,115

UNDERWATER TELEPHONY

Filed April 18, 1958

3 Sheets-Sheet 3

INVENTOR.
WALTER N. WAINWRIGHT

BY

ATTORNEYS

United States Patent Office 3,181,115
Patented Apr. 27, 1965

3,181,115
UNDERWATER TELEPHONY

Walter N. Wainwright, Waterford, Conn., assignor to the United States of America as represented by the Secretary of the Navy Filed Apr. 18, 1958, Ser. No. 729,484
10 Claims. (Cl. 340—5)
(Granted under Title 35, U.S. Code (1952), sec. 266)

The invention described herein may be manufactured and used by or for the Government of the United States of America for governmental purposes without the payment of any royalties thereon or therefor.

This application is a continuation-in-part of copending application Serial No. 651,767, filed April 9, 1957.

This invention relates to underwater telephony of the type by which persons at different areas of a body of water may communicate by telephone with one another, where the communication is solely through the water and without any wires connecting the areas, and particularly to the use therewith of a homing, constant frequency signal by which the direction of movement or location of one party can be guided or determined by the other. It is particularly useful for underwater swimmers or by persons in different areas of a body of water where they are not visible to one another. One problem of underwater swimmers, particularly those who carry their breathing supplies or equipment with them in the water, has been the absence of direct communication between different swimmers or a swimmer and his base of operation. An underwater swimmer cannot see far ahead, and hence he can easily get lost or off his intended course. A telephone that can operate under water without wires is very useful, but the equipment which must be carried by the swimmer should be as simple and compact as possible.

An object of the invention is to provide simple, compact and practical underwater telephone apparatus that can be carried by a swimmer, which uses a part of such telephone apparatus for selectively sending out in the water a sustained constant frequency signal, conveniently called a homing tone, which when picked up by another swimmer or a base ship or station will indicate to the receiver, by the direction of and the changes in intensity of, the received sustained signal the general direction in which a swimmer is traveling, enabling the receiving station to send directions or instructions to the swimmer to orient him in his desired course; which enables another to follow the homing tone as a guide to locate the swimmer sending the homing tone, which keeps to a minimum the bulk or weight of the equipment that must be carried by the swimmer, which may be made effective and ineffective at will, and which will be relatively inexpensive.

Another object of the invention is to provide an improved method of underwater communication, without wires, by which intelligence may be transmitted back and forth through the water, and with which a sustained and distinct, constant frequency, homing signal may be sent at will through the water with the use largely of the means by which intelligence is transmitted back and forth through the water.

Other objects and advantages will be apparent from the following description of one embodiment or example of the invention, and the novel features will be particularly pointed out hereinafter in connection with the appended claims.

Figure 1:
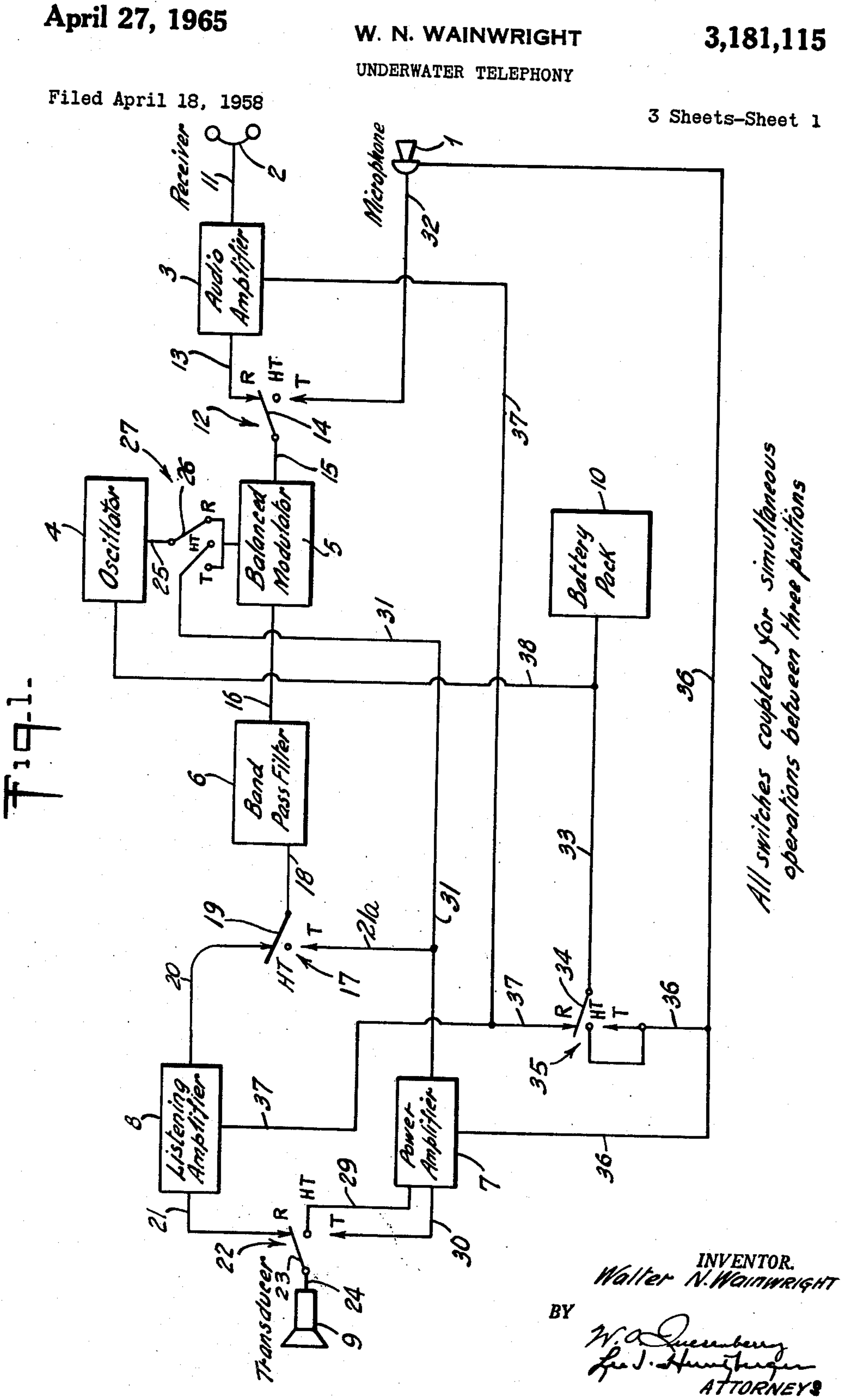
FIG. 1 is a schematic block diagram of apparatus embodying the invention.

In the illustrated example of the invention, the equipment includes a microphone 1 or other transducer for converting airborne sound waves into electric signals, a headset or speaker 2 or other transducer for converting electric signals into airborne sound waves, a tuned audio amplifier 3, an oscillator 4, a balanced modulator 5, a band-pass filter 6, a power amplifier 7, a listening amplifier 8, a bilateral transducer 9, and a battery pack 10. These are all of well known constructions used in electronic equipment.

The head set or speaker 2 is connected to the tuned audio amplifier 3 by conductive means 11, and the amplifier 3 is connected to a fixed end contact R of a switch 12 by conductive means 13. The movable contact 14 of switch 12 is connected to the balanced modulator 5 by conductive means 15, and the modulator is connected to the band-pass filter 6 by conductive means 16. The other side of filter 6 is connected to a movable contact 19 of a switch 17 by conductive means 18. A fixed contact of switch 17 is connected by conductive means 20 to one side of listening amplifier 8, the other fixed contact of switch 17 being connected by wires 21*a* and 31 to power amplifier 7. The movable contact 23 of switch 22 is connected by conductive means 24 to the bilateral transducer 9. A fixed contact of switch 22 is connected by wire 21 to the amplifier 8. Oscillator 4 is connected at its output by conductive means 25 to movable contact 26 of a switch 27. Two end contacts T and R of this switch 27 are connected together and by conductive means 28 to modulator 5.

The power amplifier 7 is connected, by conductive means 29, to the middle contact HT of switch 22, and also by conductive means 30 to the fixed contact T of switch 22. The amplifier 7 is also connected by conductive means 31 and 21*a* to the other end contact T of switch 17 and also to a middle contact HT of the switch 27. The microphone or single transducer 1 is connected by conductive means 32 to end contact T of switch 12. The battery pack 10 is connected by conductive means 33 to the movable contact 34 of a switch 35. This switch also has three fixed contacts with which the movable contact engages, one at a time, which are the two end contacts R and T, and the intermediate contact HT. The contacts HT and T in this switch are connected together, and by conductive means 36 to microphone 1 and to the power amplifier 7. The end contact R of this switch is connected by conductive means 37 to the listening amplifier 8 and to the audio amplifier 3.

The battery pack 10 is also connected by conductive means 38 to oscillator 4. The movable contacts 14, 19, 23, 26, and 34 of switches 12, 17, 22, 27 and 35 respectively are preferably mechanically coupled or ganged together so as to be operable together as a unit in a manner well known, with all movable contacts of the switches in the R end position in one operative condition of the ganged switch, all in the middle HT position at another operative condition, and all in the other end T position at still another operative condition of the ganged switch. When all of these switches are in the R positions, the system is connected to operate for the reception of signals transmitted through water and picked up and converted by the bilateral transducer 9. When all of the switches are in the other end or T positions, the system is connected to operate to send or transmit signals set up by microphone transducer 1 through the bilateral transducer 9 and propagated through water to another station or receiving set. When all of the switches are in the middle or intermediate HT position, the system is connected to send out a continuous or constant frequency signal from the oscillator 4 through wire 31 and power amplifier 7 to the bilateral transducer 9 where that continuous signal at the frequency of the oscillator is propagated through the water from transducer 9.

This continuous or constant frequency signal may be called a "homing signal" because it enables a base listening station or another swimmer to pick up the signal and by its intensity and direction determine the direction towards the swimmer sending out such a signal. Such another swimmer or the base station can send guiding directions or instructions to the swimmer sending this homing signal or tone, to guide him in the direction in which he should go in carrying out his objective or in returning to his base. The sending of such a homing signal, of course interrupts the sending of the homing tone at intervals and moves the switches to "R" positions to receive direction instructions. By pointing the transducer 9 in a particular direction, the homing signal can be propagated in a selected direction, although the vibrations propagated will spread with the distance travelled.

The homing tone frequency and the frequency of the energy fed from the oscillator to the balanced modulator are different; in other words the oscillator can generate two frequencies. The advantage of this operating arrangement over one in which the two frequencies are identical is that the homing tone is received more clearly at the swimmer's base. The transmit-receive-homing tone switching means can be readily connected so as to cut in and cut out a selected reactive portion of the oscillator 4 to produce a homing tone of different frequency from the carrier frequency. The homing signal is thus obtained from the oscillator at a selected fixed frequency differing from the frequency of the carrier signal delivered by the oscillator to the modulator.

Since the system advantageously uses some of the equipment in common for sending and receiving intelligence, or in sending or receiving the homing tone, it is possible to have a very compact and relatively light and simple unit for a swimmer to carry with him in the water. In order that the constant frequency or homing signal may be audible through the receiver of the other swimmer or the swimmer's base station, the chosen constant frequency signal from the oscillator must be equal to some audible frequency within the band of 0.3 to 3 kc. plus the frequency of the oscillator during normal reception and transmission in order to have an audible signal passed by the receiving station modulator. If the constant frequency transmitted is 9.2 kc., and the oscillator output during normal sending or reception of voice intelligence is 8.1 kc., then at the receiving station the modulator and audio amplifier will pass a constant frequency signal of 1.1 kc.

It has been found that for underwater transmission of intelligence, with the equipment herein described and illustrated, excellent results are obtained by using a frequency range for the transmission or propagation of intelligence of acoustic energy of about 8 to 11 kc. for a 3 kc. intelligence band. By setting the oscillator frequency to deliver a signal frequency of about 8.1 kc., it is possible to obtain a frequency range of transmission from the bilateral transducer into the water of about 8.3 to 11.1 kc. where the microphone or pickup transducer has a response in the 250 c.p.s. to 3 kc. range.

In use, a swimmer carrying the equipment illustrated, when he wishes to talk with another swimmer or a base station having similar equipment, merely operates all of the ganged switches to place all of the movable contacts of those switches in the T position. He then talks into the microphone 1. The electric signals set up by the microphone in response to such talking are passed through the modulator 5 where they modulate the amplitude of the constant frequency signal from the oscillator. This modulated signal then passes through the band-pass filter 6 which removes all but one of the sidebands of the moulated signal, which one sideband may be the upper sideband, and this upper sideband signal then passes through the power amplifier 7 to the bilateral transducer 9. The latter converts the signal into waterborne sound waves in the water and such sound waves travel through the water to the other swimmer or to the base station where they are converted into audible signals.

When the swimmer wishes to receive signals from the other swimmer or his base station, he operates all of the ganged switches together into the R positions which sets the equipment for reception of signals. Now the waterborne sound waves coming through the water are converted into electric signals by the bilateral transducer 9, and these signals pass through the listening amplifier where they are amplified, then through the band-pass filter where some noises and other signals not in the sideband range are removed. The passed signals then pass through the balanced modulator 5 where the carrier signal from the oscillator 4 is introduced to provide a modulated signal, and then the modulated signal passes through the tuned audio amplifier 3 to the head set 2. This tuned amplifier 3 passes only signal components in the audio frequency range.

The transducer 9 is called a bilateral transducer because the same unit can convert electric signals into waterborne sound waves propagated in the fluid medium in which it is placed, or convert waterborne sound waves received from the fluid medium in which it is placed, into electric signals.

When the swimmer wishes to send out his homing signal, he moves the ganged switches to the HT or intermediate positions, which automatically connects the output of the oscillator by conducting means 31 to the power amplifier 7, where the constant frequency signal directly from the oscillator is amplified. This amplified signal then passes from the power amplifier 7 through the conducting means 29 to switch 22 and thence to the bilateral transducer 9 where the signal of constant frequency is propagated as waterborne sound waves through the water to be picked up by another swimmer or the first swimmer's base station.

Figure 2:
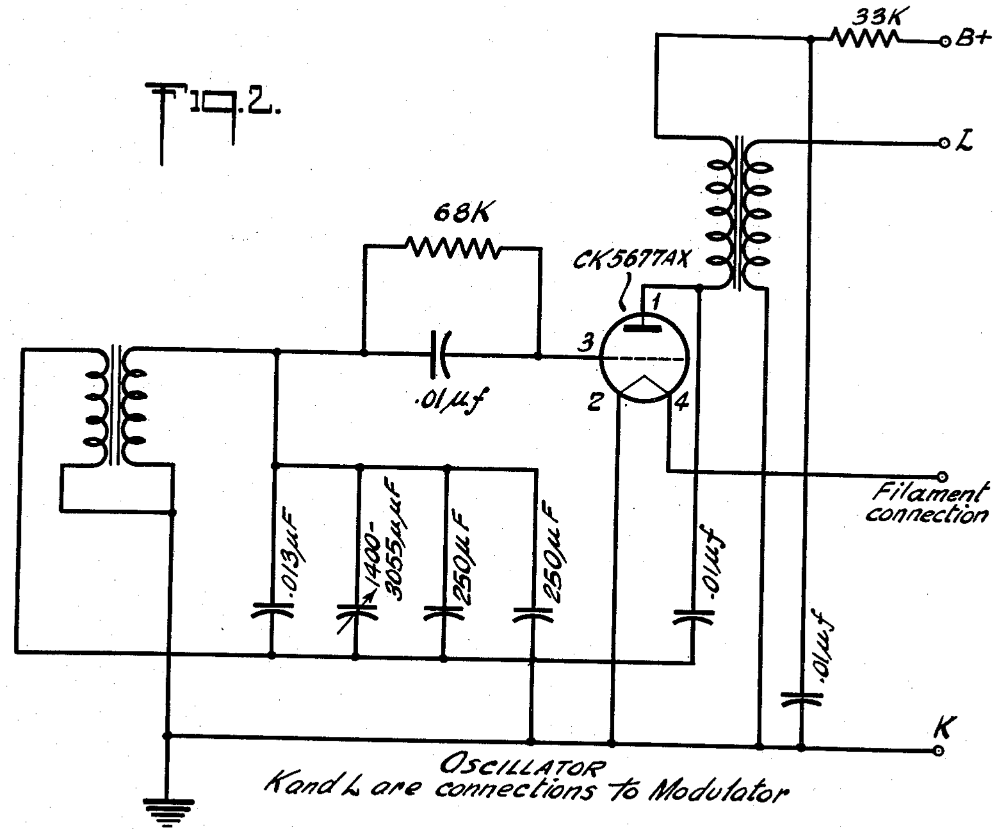
FIG. 2 is a circuit diagram of an oscillator which forms a part of the apparatus.
Figure 3:
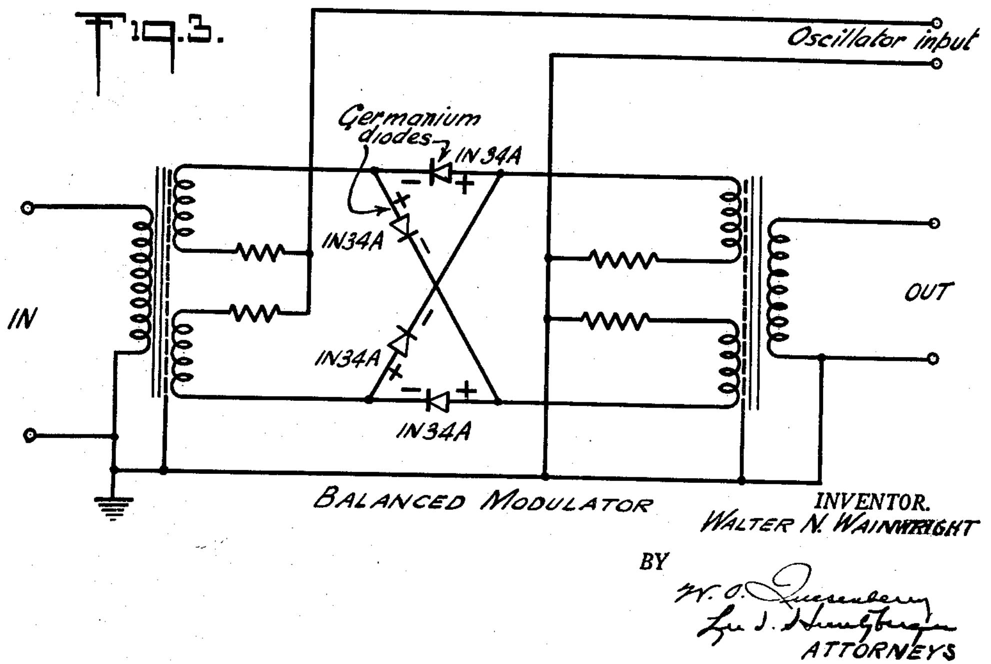
FIG. 3 is a circuit diagram of balanced modulator which forms a part of the apparatus.
Figure 4:
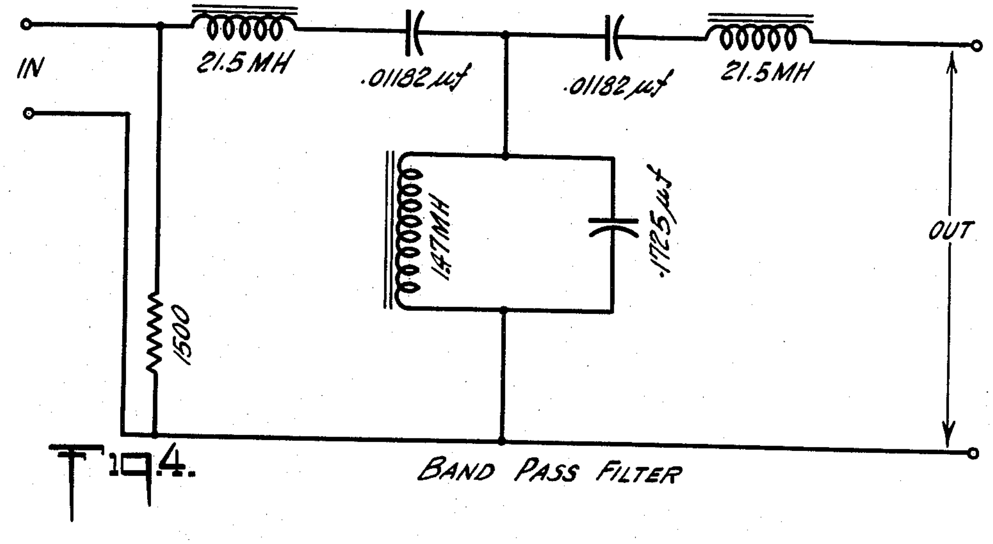
FIG. 4 is a circuit diagram of a band-pass filter which forms a part of the apparatus.
Figure 5:
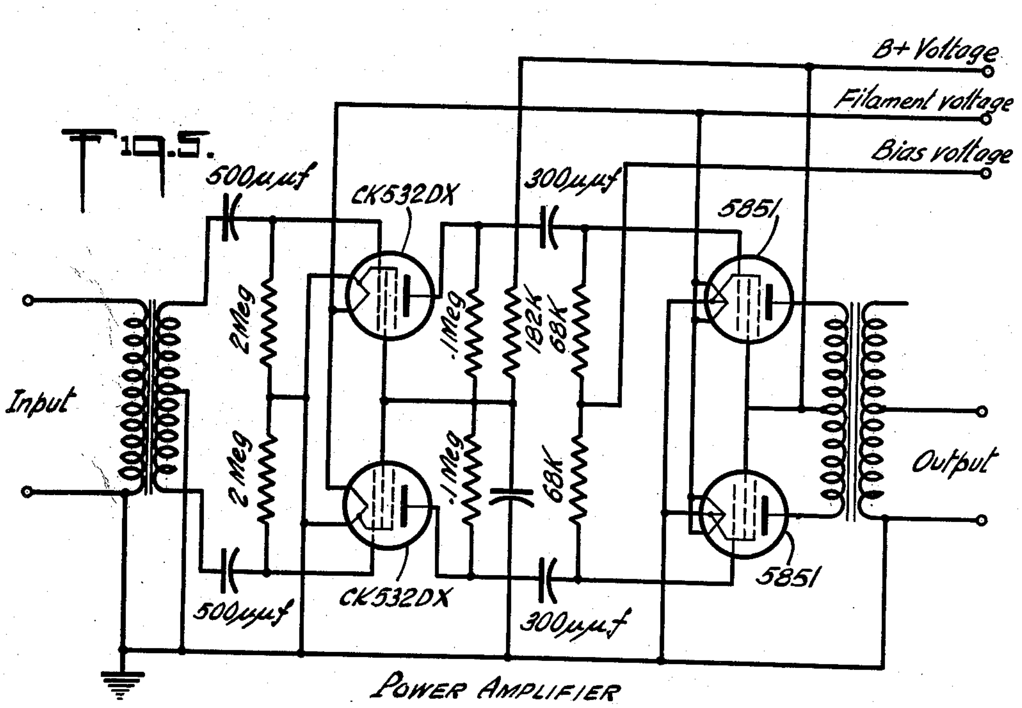
FIG. 5 is a circuit diagram of a power amplifier which forms a part of the apparatus.

Any suitable circuits for the oscillator, balanced modulator, band-pass filter and power amplifier, may be employed, but to make the disclosure complete in itself, typical and suitable circuits of these parts are illustrated in FIGS. 2 to 5 inclusive. The audio amplifier 3 and listening amplifier are so well known that it is not considered necessary to illustrate or further describe them.

It will be understood that various changes in the details and arrangements of parts, which have been herein described and illustrated in order to explain the nature of the invention, may be made by those skilled in the art within the principle and scope of the invention as expressed in the appended claims.

I claim:

1. An underwater transmitter for complex intelligence comprising a first transducer for converting complex intelligence into an electrical intelligence signal, an oscillator for generating a selected fixed frequency signal, means for mixing the oscillator output and said intelligence signal to produce a single sideband suppressed carrier amplitude modulation of said oscillator signal, and a second transducer for converting the sideband signal into acoustic energy and propagating the same into water, the frequency of said oscillator being chosen to provide a frequency band for the second transducer output of approximately 8 to 11 kc. when carrying intelligence having frequencies up to about 3 kc., thereby providing for optimum intelligibility of the transmitted intelligence when received and demodulated, and further including means cooperating with said oscillator for generating a second selected fixed frequency signal of frequency differing from that of the first mentioned fixed frequency signal by an audible frequency and for feeding said second fixed frequency signal unmodulated to said second transducer.

2. A transceiver for underwater transmission of complex intelligence comprising a means for converting complex intelligence into electrical intelligence signals, an oscillator for generating a fixed frequency electrical output, a balanced modulator for mixing said oscillator output with a second electrical signal to produce an oscillator-frequency-suppressed amplitude modulated signal of upper and lower sidebands, a first filter means adapted to pass one sideband of frequencies connected to one side of said modulator means, a transducer connected to said first filter means for interconverting in water acoustic energy and electrical energy into their respective counterparts, a second filter means adapted to pass only frequencies below that of the oscillator output, means for converting the output of said second filter means to a desired presentation form, and means for selectively connecting the first mentioned means and the second filter means to the other side of said modulator for intelligence transmission and reception respectively, the frequency of the oscillator output being chosen to provide a frequency band for said sideband of frequencies passed by said first filter means during transmission of approximately 8 to 11 kc. when carrying intelligence having frequencies up to about 3 kc., thereby providing for optimum intelligibility of the transmitted signal when received and demodulated, and further including means cooperating with said oscillator for generating a second fixed frequency electrical output of frequency differing from that of the first mentioned fixed frequency output by an audible frequency and for feeding said second fixed frequency output unmodulated to said second transducer.

3. Underwater voice communication equipment for transmitting intelligence between two spaced apart stations separated by a body of water, which comprises at one station a sending transducer for converting sound waves into electrical signals, a receiving transducer for converting electric signals into sound waves, a bilateral transducer for converting electrical signals into waterborne sound waves in said body of water for transmission through said water to the other station and for converting waterborne sound waves received from said water into electric signals, a modulator, an oscillator operatively coupled to said modulator for impressing the frequency of the oscillator upon any signals passing through the modulator, a band-pass filter, a power amplifier, a receiver amplifier, a tuned audio amplifier, sending means including the connection in series therein and in this order, said sending transducer, said modulator, said band-pass filter, said power amplifier, and said bilateral transducer, receiving means including in series therein and in this order, said bilateral transducer, said receiver amplifier, said band-pass filter, said modulator, said tuned audio amplifier and said receiving transducer, switch means for selectively and alternately rendering effective said sending and said receiving means, and a homing circuit controlled by said switch means and selectively rendered effective by said switch means when neither of said sending or receiving means is effective, said homing circuit including in series therein and in this order, said oscillator, said power amplifier and said bilateral transducer, whereby when said homing circuit is made effective by said switch means, a signal corresponding to the frequency of said oscillator will be converted into waterborne sound waves in said water by said bilateral transducer to be transmitted to the other of said stations.

4. An underwater telephone comprising means for converting airborne sound waves into corresponding electric signals, an oscillator for emitting a carrier of uniform frequency, means by which said carrier is modulated in amplitude by said signals, means connected to said last means to receive said modulated signals and pass solely a sideband of said modulated carrier signals, a transducer connected to said last means to convert said sideband signals into waterborne sound waves in said water for transmission through the water, and means by which a carrier directly from said oscillator can be transmitted to said transducer for conversion into waterborne sound waves in said water as a homing signal tone.

5. An underwater telephone comprising means for converting airborne sound signals into electric signals, means for converting said electric signals into waterborne sound waves in said water for transmission through said water, means including an oscillator and a suitable modulator for causing modulation of a carrier signal from the oscillator by said electric signals and then passing to said second mentioned converting means only a selected sideband of the modulated carrier signals, and means cooperating with said oscillator for selectively transmitting a fixed frequency signal from the oscillator to said second mentioned means for converting, whereby when said last mentioned means is activated it will send out through said water an unmodulated homing signal of fixed frequency.

6. An underwater telephone which comprises means for converting airborne sound waves into electric signals, means for cerating an unmodulated carrier signal, means for modulating the amplitude of said carrier signal by said electric signals, means for converting electric signals into waterborne sound waves in said water for transmission therethrough, means for conveying said modulated carrier signal to said second mentioned converting means and having therein a band-pass filter which limits passage of signals to one selected sideband of said modulated carrier, and means for also connecting said carrier signal creating means directly to said second mentioned converting means to operate the latter, whereby an unmodulated signal from said signal creating means may be imparted to the water for transmission therethrough.

7. The method of transmitting, solely through a large body of water, intelligence signals from one station to another, which comprises creating electric signals corresponding in frequency and amplitude to said signals to be transmitted, modulating, by amplitude modulation, an unmodulated carrier signal with said electric signals, removing from said modulated carrier signal those signals having frequencies outside of a selected sideband, converting those carrier signals having frequencies within said sideband into waterborne sound waves for transmission through the water to the other station and selectively sending an unmodulated carrier signal as waterborne sound waves in said water as a homig signal.

8. The method of communication between stations solely through water, which comprises converting airborne sound waves to be transmitted into corresponding electric signals, modulating the amplitude of a constant frequency unmodulated carrier signal by said electric signals, removing from the modulated carrier signal only one sideband thereof, converting that removed sideband into waterborne sound waves of corresponding frequencies in the water for transmission through the water to another station, and selectively sending an unmodulated carrier signal as waterborne sound waves in said water as a homing signal.

9. An underwater telephone comprising means for converting airborne sound waves into corresponding electric signals, oscillator means for creating a constant frequency carrier signal, means connected to said oscillator means for receiving said carrier signal and modulating its amplitude by said electric signals, means for receiving said modulated carrier signal and passing solely one sideband thereof, means connected to said sideband passing means for converting said passed signals into waterborne sound waves in a body of water for transmission therethrough to a receiving station, and means connected to said oscillator means and said converting means and operable to send a constant frequency signal unmodulated through said converting means for propagation through said water.

10. The telephone as set forth in claim 9 and means by which sending of the modulated signal is prevented when the last mentioned constant frequency signal is being sent unmodulated to said converting means.

References Cited by the Examiner

MIL-C-17831 A (Ships), Feb. 16, 1956, 179—1.

CHESTER L. JUSTUS, *Primary Examiner.*

KATHLEEN CLAFFY, L. MILLER ANDRUS, *Examiners.*